United States Patent
Murphy et al.

(10) Patent No.: US 6,565,244 B1
(45) Date of Patent: May 20, 2003

(54) SINGLE SOURCE IDENTIFICATION LIGHT BAR

(75) Inventors: Timothy C. Murphy, Leawood, KS (US); Gary A. Hill, Spring Hill, KS (US)

(73) Assignee: Peterson Manufacturing Company, Grandview, MO (US)

( * ) Notice: Subject to any disclaimer, the term of this patent is extended or adjusted under 35 U.S.C. 154(b) by 0 days.

(21) Appl. No.: 10/114,802

(22) Filed: Apr. 2, 2002

(51) Int. Cl.[7] .................................................. F21V 9/00
(52) U.S. Cl. ...................... 362/511; 362/551; 362/555; 362/540; 362/487; 362/459; 385/47; 385/901
(58) Field of Search .............................. 362/551, 555, 362/509, 511, 335, 485, 496, 540, 298, 487; 385/901, 33, 47

(56) References Cited

U.S. PATENT DOCUMENTS

| | | | |
|---|---|---|---|
| 4,012,630 A | * | 3/1977 | Gareis .......................... 362/582 |
| 4,947,293 A | | 8/1990 | Johnson et al. |
| 5,122,933 A | | 6/1992 | Johnston |
| 5,416,669 A | | 5/1995 | Kato et al. |
| 5,465,194 A | | 11/1995 | Currie |
| 5,495,400 A | | 2/1996 | Currie |
| 5,567,031 A | | 10/1996 | Davenport et al. |
| 5,573,327 A | | 11/1996 | Dealey, Jr. et al. |
| 5,647,658 A | | 7/1997 | Ziadi |
| 5,678,914 A | | 10/1997 | Dealey et al. |
| 5,897,201 A | * | 4/1999 | Simon ......................... 362/268 |
| 6,065,846 A | * | 5/2000 | Kato et al. ..................... 362/30 |
| 6,264,376 B1 | * | 7/2001 | Savage, Jr. .................. 385/88 |

OTHER PUBLICATIONS

Sales Catalog No. 197 of Peterson Manufacturing Company, specifically p. 23, showing a 2"Piranha* Led Combination Clearance/ Sidemarkerlight, exact publication date unknown, but at least one year prior to the filing of the present application.

* cited by examiner

Primary Examiner—Sandra O'Shea
Assistant Examiner—Ali Alavi
(74) Attorney, Agent, or Firm—Shughart, Thomson & Kilroy, P.C.

(57) ABSTRACT

An identification light bar as required by 49 C.F.R. Section 571.108 for vehicles over eighty inches in width is disclosed. The light bar comprises an elongate body having a center optic, left and right distal optics, and left and right light pipes which connect the respective distal optics to the center optic. Each optic is covered by a respective lens cap. A single LED is connected to the body in alignment with the center optic. The center optic receives light emitted by the LED and divides the light such that a first portion thereof is emitted from the light bar through the center lens cap, a second portion thereof is transmitted along the left light pipe and emitted through the left lens cap, and a third portion thereof is transmitted along the right light pipe and emitted through the right lens cap.

29 Claims, 5 Drawing Sheets

SINGLE SOURCE IDENTIFICATION LIGHT BAR

BACKGROUND OF THE INVENTION

1. Field of the Invention

This invention relates to an identification light bar as required by 49 C.F.R. §571.108 for vehicles over 80 inches in width, and in particular to such an identification light bar having three lenses illuminated by a single light source, such as a single light emitting diode.

2. Description of the Related Art

Section 571.108 of the Code of Federal Regulations requires that all multipurpose passenger vehicles, trucks, trailers and buses having an overall width of over 80 inches be equipped with a set of three red identification lamps which are mounted on the rear of the vehicle in order to alert other motorists to the presence of a wide vehicle. The lamps are to be mounted as close as practicable to the top of the vehicle, at the same height, and as close as practicable to the centerline of the vehicle. The centers of the lamps must be not less than six or more than 12 inches apart. Multipurpose passenger vehicles, trucks and buses having an overall width of over 80 inches must also be equipped with a similar set of amber identification lamps on the front of the vehicle.

Traditionally, these sets of identification lights have been illuminated by incandescent bulbs, with one or more of the bulbs being mounted in each of the three lamps. Incandescent bulbs, however, are prone to failure, and the bulbs must be inspected and replaced regularly. In recent years, lighting manufacturers have begun to substitute light emitting diodes (LEDs) for the incandescent bulbs used in vehicle lighting. LEDs have a rated life of 100,000 hours, which is far superior to that of an incandescent bulb.

LEDs can be used in an identification light system by placing one or more of the LEDs in each of three lamps. The assignee of the present invention produces an identification light bar using LEDs in this manner, the Peterson Manufacturing Co. Piranha® LED Model 160-3R. Vehicle lamps incorporating multiple LED light sources can be relatively expensive, however and require multiple electrical connections.

There would be distinct advantages to an identification lamp system wherein a single LED was used to illuminate all three of the identification lamps. Such a system would be less expensive to produce, and would draw less current than a multiple LED system. Lower current draw would allow the use of lighter gauge wiring, further lowering the cost of using such a system. Furthermore, use of a single light source reduces the number of electrical connections required to power the identification light system. Fewer connections means both simpler installation and fewer potential failure points.

It has previously been known to pipe light from a single source for use as vehicle marker lighting. U.S. Pat. No. 4,947,293 to Johnson, et al. discloses a vehicle clearance light system wherein light from a single source is piped through a light conducting strip clad in a translucent material having a different index of refraction from the core material. The result is a continuous strip of lighted material around the top of a vehicle which can serve as clearance lighting. Note that as shown in FIG. 2, this device is intended as a supplement to the existing lighting required by vehicle regulations and not as replacement therefor. The continuous strip of light produced by this system is incapable of serving the mandated identification function, since the regulation requires three distinct lamps spaced a specified distance apart.

U.S. Pat. No. 5,122,933 to Johnson discloses a combination clearance light and message system for trucks. In this system, a pair of fiber-optic cables pipe light from a single high intensity source around the perimeter of a truck trailer. The cables are encased within an enclosure having a translucent face plate. The face plate can be provided with a graphic message such as an advertising slogan which is illuminated by light from the fiber optic cables. It is also specified that a portion of the enclosure may be colored to provide the legally required clearance lighting function. It should be noted that this system utilizes a high intensity light source, such as a quartz halogen lamp, to provide illumination to the entire length of a semi trailer. A high intensity system of this kind is not suitable to the more limited task of serving the federally mandated identification light function for wide vehicles.

In a related product, the Assignee of the present invention has for more than one year manufactured a round, two inch diameter, combination clearance and side marker light, the Peterson Manufacturing Co. Piranha® LED Model 165. This light is designed to function as both a clearance light and a side marker light when mounted on a forty five degree angle. The lamp includes a center LED which is focused onto a portion of the lens having surfaces inclined at a 45 degree angle which act as a prism to deflect portions of the light from the center LED in respective lateral directions, allowing the lamp to be clearly seen from the sides.

SUMMARY OF THE INVENTION

The present invention comprises a light bar for a vehicle having three lenses illuminated by a single light source, such as an LED. The lenses may be spaced apart and colored so as to comply with 49 C.F.R. §571.108 as identification lamps for vehicles over 80 inches in width. The light bar includes an elongated, transparent body having a center optic, a left distal optic, a right distal optic, a left light pipe extending outwardly from the center optic to the left distal optic, and a right light pipe extending outwardly from the center optic to the right distal optic. Each of the optics is covered by a respective lens.

The light source is aligned with the center optic such that the center optic receives light emitted by the light source and divides the light into three portions of generally equal intensity. A first portion of the light is emitted from the light bar through the lens covering the center optic, a second portion is transmitted along the left light pipe and emitted from the light bar through the lens covering the left distal optic, and a third portion is transmitted along the right light pipe and emitted from the light bar through the lens covering the right distal optic.

Each of the lenses includes a tubular sidewall and an end wall closing one end of the tubular sidewall. The light bar is mounted on the interior of a front or rear wall of the vehicle with the tubular sidewalls of the lenses extending through respective holes in the vehicle wall. The holes in the vehicle wall are sealed by respective elastomeric gaskets such that only the end walls of the lenses are visible from the exterior of the vehicle. When mounted in this manner, light emitting from the lenses will be seen from outside the vehicle and any light leaking from other parts of the light bar will not.

The tubular sidewall of each lens may include an annular ridge which extends outwardly therefrom, and each grommet may include an internal annular groove sized and shaped to receive the annular ridge of the respective lens. If the annular ridges are formed with a tapered front edge and a square rear edge, the tapered front edges will allow the lenses to be easily inserted into the respective grommets whereas the square rear edges will inhibit the lenses from being pulled out of the grommets, thereby securing the light bar to the vehicle.

DETAILED DESCRIPTION OF THE PREFERRED EMBODIMENT

Figure 1:
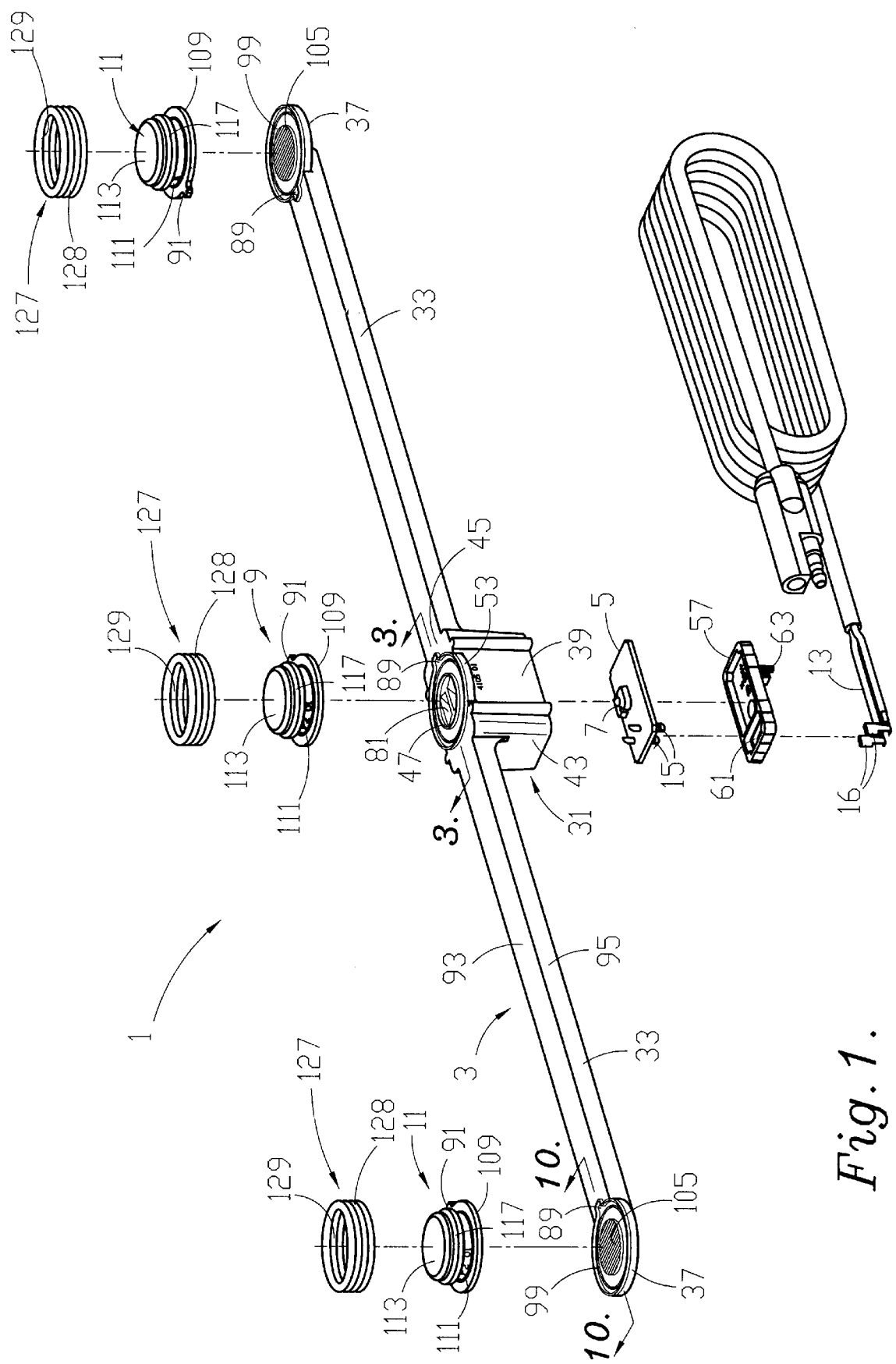
FIG. 1 is an exploded perspective view of a light bar embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, and in particular to FIG. 1, the reference number 1 designates an identification light bar embodying the present invention. The light bar 1 generally comprises an elongate transparent body 3, a circuit board 5 with its attached electronic components including a single light-emitting diode (LED) 7, a center lens 9, and two distal lenses 11. Lead wires 13 are provided for connecting the circuit board 5 to the electrical system of a vehicle (not shown).

Figure 2:
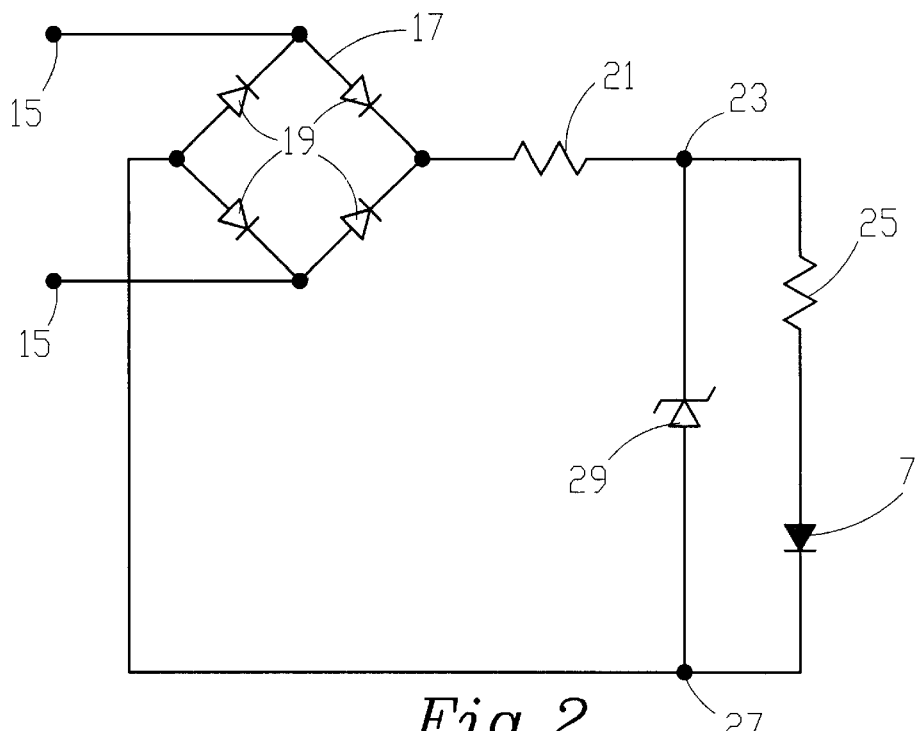
FIG. 2 is a schematic diagram of the electronic components of the light bar.

In addition to the LED 7, the circuit board 5 includes the electronic components required to illuminate the LED 7, the circuit diagram for which is shown in FIG. 2. Male blade terminals 15 are provided on the board 5 for connecting the board to female flag terminals 16 on the lead wires 13 (see FIG. 1). Referring again to FIG. 2, the terminals 15 are connected to a full wave rectifier bridge 17 comprising four diodes 19. The rectifier bridge 17 insures that the proper polarity is provided to the LED 7 irrespective of how the lead wires 13 are connected to the vehicle wiring system. From the rectifier bridge 17, current flows through a 91 ohm first resistor 21 to a first junction 23. From the first junction 21, current flows through a 68 ohm second resistor 25 to the anode of the LED 7. The cathode of the LED 7 is connected back to the rectifier bridge 17 through a second junction 27. A unidirectional transient voltage suppressor 29 is connected in parallel to the second resistor 25 and LED 7 between junctions 23 and 27. The transient voltage suppressor 29 serves to protect the LED 7 from voltage surges.

Referring again to FIG. 1, light produced by the single LED 7 is divided and transmitted through the body 3 so as to be emitted through the center lens 9 and two distal lenses 11 at approximately equal intensities. The lenses 9 and 11 thereby serve the function of the three identification lamps required by Section 571.108 of the Code of Federal Regulations. If the light bar 1 is intended for mounting on the rear of a vehicle, the lenses 9 and 11 will be red in color, whereas if the light bar 1 is intended for mounting on the front of the vehicle, the lenses 9 and 11 would be amber in color. Alternatively, the lenses 9 and 11 could be clear with either a red or amber LED 7 used, depending upon the intended mounting location of the light bar 1.

The body 3 is preferably formed as a unitary piece which is molded of clear lens grade acrylic. A polycarbonate material could be used in place of acrylic, however acrylic is less likely to bend and transmits light with less loss. The body 3 generally includes a central chamber 31 and a pair of light pipes 33 which extend outwardly therefrom. Each light pipe 33 has a distal end 35 which includes a respective distal lens mounting base 37 which serves as a mounting location for a respective one of the distal lenses 11.

Figure 3:
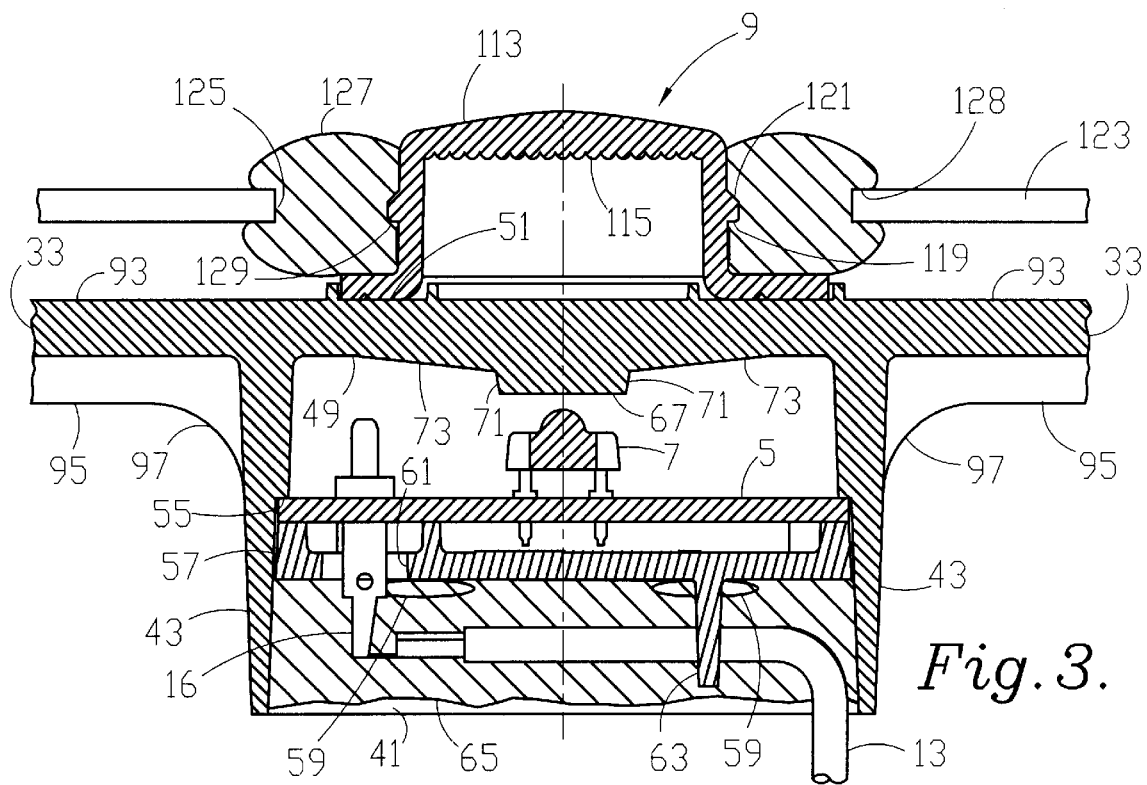
FIG. 3 is an enlarged cross-sectional view of the central portion of the light bar taken generally along line 3—3 in FIG. 1.

Referring to FIG. 3, the central chamber 31 is generally in the form of a rectangular box having a top wall 39 (see FIG. 1), a bottom wall 41 and opposed sidewalls 43. The front of the central chamber 13 is enclosed by a front wall 45 which includes a center optic 47 to be described in detail later. The front wall 45 has an inner surface 49, an outer surface 51, and further includes a center lens mounting base 53 formed on the outer surface 51 which serves as an attachment point for the center lens 9. The mounting base 53 is centered over the center optic 47. The back of the chamber 31 is open and provides a mounting location for the circuit board 5.

When installed in the chamber 31, the circuit board 5 is seated against an inwardly extending ledge 55 formed on the chamber walls 39, 41 and 43. An ABS backing plate 57 is inserted into the chamber 31 behind the circuit board 5 to hold the board 5 in position. The backing plate 57 snaps into position by engaging protrusions 59 formed on the chamber top wall 39 and bottom wall 41. An opening 61 in the backing plate 57 is provided to allow the lead wires 13 to pass therethrough. The backing plate 57 further includes a wire retainer 63 which holds the lead wires 13 in position. After the circuit board 5, lead wires 13 and backing plate 57 are installed in the chamber 31, curable urethane sealant 65 is poured into the rear of the chamber 31. Once cured, the sealant 65 prevents moisture from entering the chamber 31. With the circuit board 5 thus installed in the chamber 31, the LED 7 mounted thereon is centered behind the center optic 47 in closely spaced relation thereto such that light emitted by the LED 7 is directed onto the center optic 47.

Figure 4:
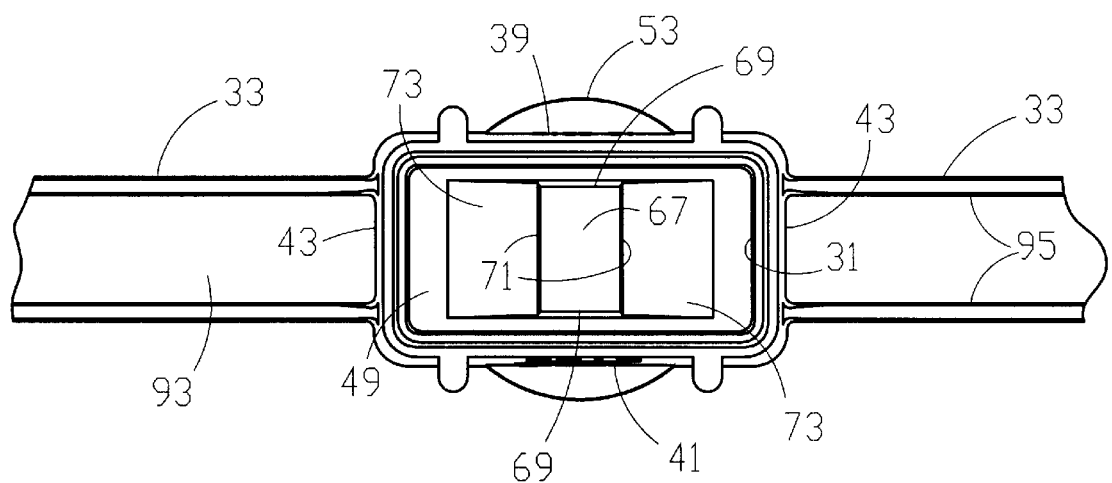
FIG. 4 is an enlarged, fragmentary rear view of the body of the light bar showing the center optic thereof.

Referring to FIG. 4, the center optic 47 includes a generally rectangular projection 67 which extends rearwardly from the inner surface 49 of the front wall 45 and into the chamber 31. The projection 67 is centered on the wall 45 and includes a pair of longitudinal edges 69 which are each spaced inwardly from a respective one of the top wall 39 and the bottom wall 41. The projection 67 also includes a pair of transverse edges 71 which are spaced inwardly from the respective sidewalls 43. A pair of inclined planes 73 are formed on the inner surface 49 between the transverse edges 71 of the projection 67 and the respective sidewalls 43. The planes 73 slope rearwardly from a point on the inner surface 49 which is spaced inwardly from the respective sidewall 43 to a point approximately midway up the respective transverse edge 71.

Figure 5:
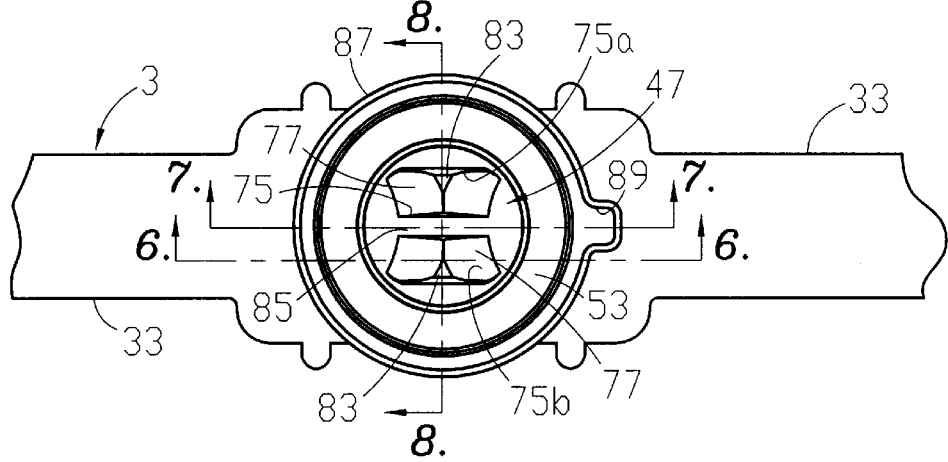
FIG. 5 is an enlarged, fragmentary front view of the body of the light bar showing the center optic thereof.
Figure 6:
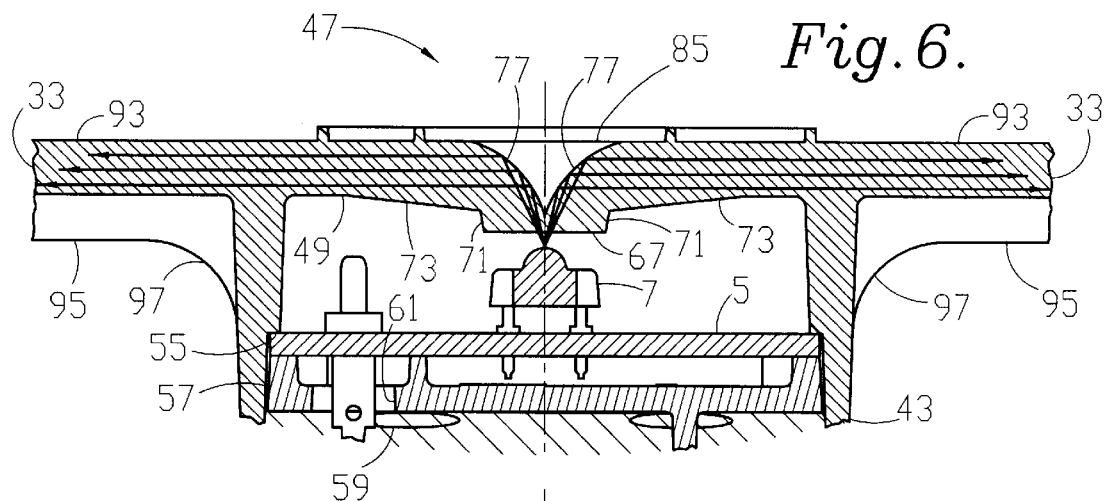
FIG. 6 is an enlarged, fragmentary cross-sectional view of the center optic taken generally along line 6—6 in FIG. 5 and showing reflection of light down opposing light pipes.

Referring to FIG. 5, the center optic 47 further includes a cavity 75 which extends inwardly from the outer surface 51 of the front wall 45, through the front wall 45, and into the projection 67. The cavity 75 is defined by a pair of sidewalls 77, opposing top and bottom walls 81, and a back wall 83. The sidewalls 77 are inwardly curved such that the cavity 75 has a generally hourglass shape when viewed from the front. The sidewalls 77 are also inwardly sloped from front to rear in a convex curve selected to direct that portion of the light from the LED 7 which is incident on one of the sidewalls 77 down the respective light pipe 33, as shown in FIG. 6. The back wall 83 is only visible from the front of the body 3 as a pair of small triangular portions at the top and bottom of the cavity 75.

Figure 7:
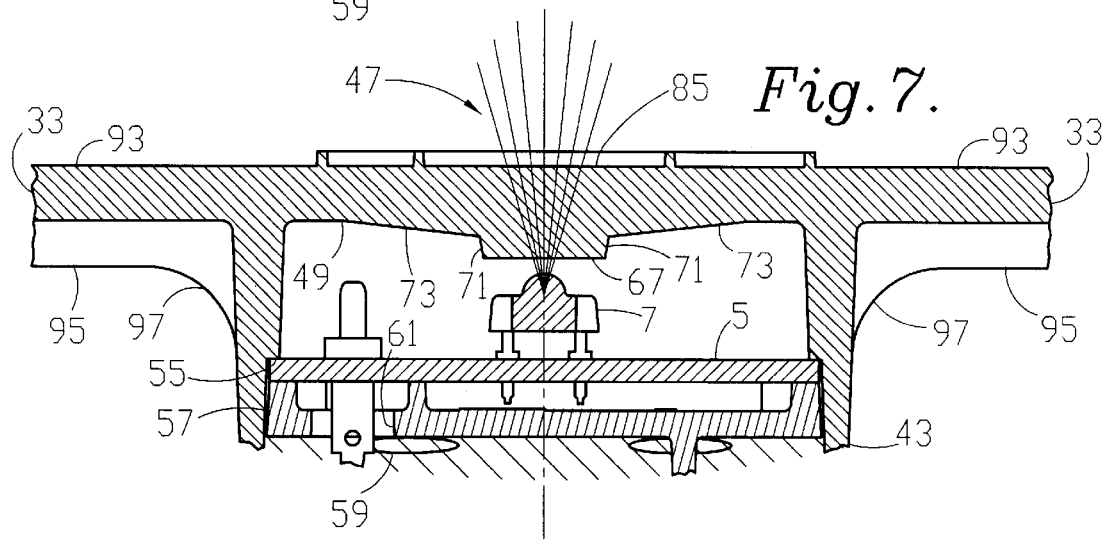
FIG. 7 is an enlarged, fragmentary, cross-sectional view of the center optic taken generally along line 7—7 in FIG. 5 and showing transmission of light outwardly from the center optic.
Figure 8:
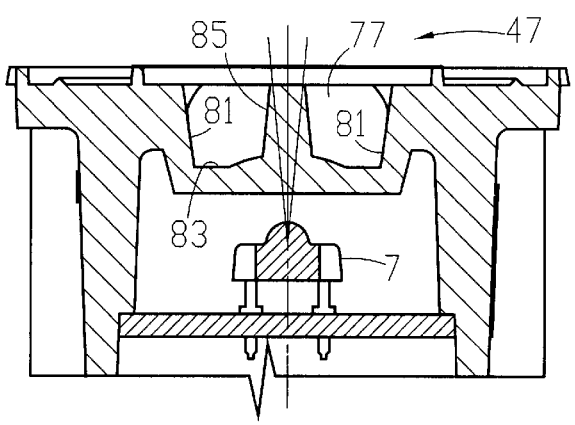
FIG. 8 is an enlarged, fragmentary, cross-sectional view of the center optic taken generally along line 8—8 in FIG. 5 and showing transmission of light outwardly from the center optic.

A bridge wall 85, which forms a part of the center optic 47, is formed across the cavity 75 along the longitudinal centerline of the body 3 so as to divide the cavity 75 into upper and lower portions 75a and 75b, respectively. The bridge wall 85 is aligned with the LED 7 and has a thickness which is sufficient for the wall 85 to form a light conduit which allows a portion of the light from the LED 7 to pass directly therethrough, as shown in FIGS. 7 and 8.

The center lens mounting base 53 surrounds the cavity 75 and comprises a circular platform upon which the center lens 9 is mounted. The base 53 includes an annular ridge 87 which acts to locate the lens 9. The ridge 87 includes a keyway 89 which accepts an aligning tab 91 on the lens 9 (see FIG. 1).

Referring again to FIG. 3, the light pipes 33 each extend outwardly from a respective one of the sidewalls 43 of the central chamber 31 in respective opposing longitudinal directions. The light pipes 33 each have a generally C-shaped cross-section and include a front wall 93 and opposed top and bottom webs 95. The front walls 93 are generally the same thickness as the chamber front wall 45 and are aligned in register with the chamber front wall 45 so that the front walls 93 generally form extensions of the chamber front wall 45. The webs 95 serve both as structural strengthening members and as additional light transmission paths. Fillets 97 formed at the junctions between the webs 95 and chamber sidewalls 43 add additional strength to the light pipes 33.

Figure 9:
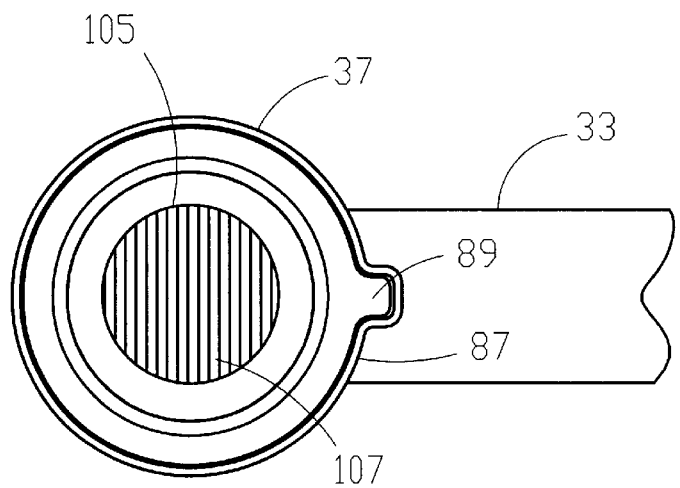
FIG. 9 is an enlarged, fragmentary front view of the body of the light bar showing the left distal portion thereof.

As best seen in FIG. 9, the distal lens mounting bases 37 are each integrally formed with one of the light pipes 33 at the distal end 35 thereof. Each distal lens mounting base 37 is in the form of a circular plate, the outer face of which is oriented generally in alignment with the front wall 93 of the respective light pipe 33. Each distal lens mounting base 37 extends outwardly past the distal end 35 of the respective light pipe 33 such that the distal end 35 is oriented in the center of the respective distal lens mounting base 37. Like the center lens mounting base 53, the distal lens mounting bases 37 each include an annular ridge 87 which acts to locate the respective lens 11. The ridges 87 each include a keyway 89 which accepts an aligning tab 91 on the respective lens 11.

Figure 10:
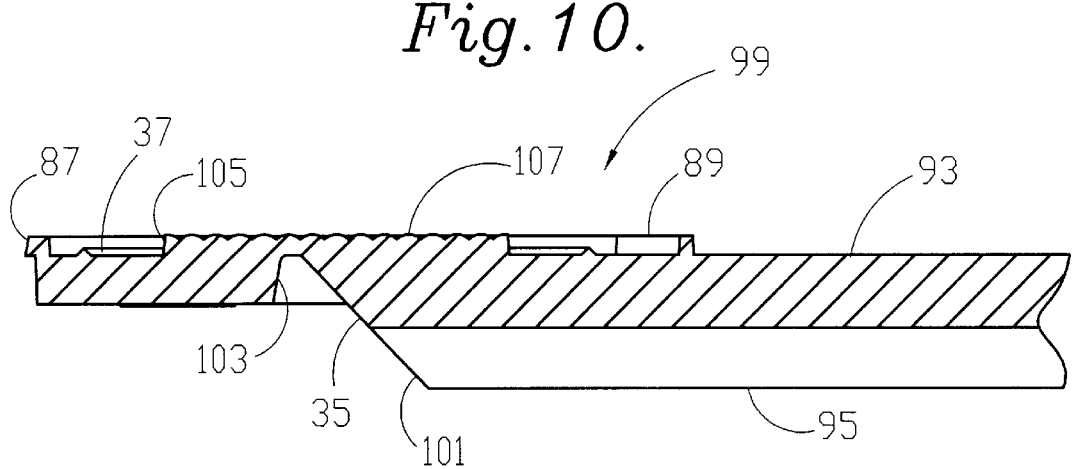
FIG. 10 is an enlarged, fragmentary cross-sectional view of the body of the light bar showing the left distal portion thereof, taken generally along line 9—9 in FIG. 1.

Referring to FIG. 10, the distal ends 35 of the light pipes 33 further include a distal optic 99 which serves to refract light transmitted along the respective light pipe 33 and direct it toward the respective distal lens 11. Each distal optic 99 includes a distal end surface 101 of the respective light pipe 33 which is canted inwardly from front to back at a roughly forty-five degree angle. A relief 103 is formed in the rear of each mounting base 37 such that the respective end surface 101 extends substantially the thickness of the front wall 93 of the respective light pipe 33. Each distal optic 99 further includes a circular pad 105 formed on the front surface of the respective mounting base 37. Each pad 105 has a plurality of vertical flutes 107 formed thereon.

As shown in FIGS. 1 and 3, each of the lenses 9 and 11 includes an annular mounting flange 109 which is sonic welded to the respective lens mounting base 37 or 53. A tubular sidewall 111 extends outwardly from the annular mounting flange 109 to a front plate 113 which encloses the front of the respective lens 7 or 9. Each front plate 113 includes a lens optic 115 comprising a textured inner lens surface having both horizontal and vertical striations. The aligning tab 91 of each lens 9 or 11 extends outwardly from the respective mounting flange 109 and engages the respective keyway 89 to align the striations in the proper orientation. An outwardly extending annular ridge 117 is formed around each lens sidewall 111. Each flange 117 has a square rear edge 119 and a tapered front edge 121 (see FIG. 1).

As best seen in FIG. 3, the fight bar 1 is mounted inside a front or rear wall 123 of a vehicle. Three mounting holes 125 are cut through the wall 123 and spaced an appropriate distance apart to align with the lenses 9 and 11 of the light bar 1. Rubber grommets 127 having an inside diameter matching the diameter of the lens tubular sidewalls 111 are inserted into the mounting holes 125. Each grommet 127 includes a circumferential annular groove 128 which is sized to accept an annular portion of the vehicle wall 123 which surrounds the mounting a respective one of the mounting holes 125. Each grommet 127 also has an internal annular groove 129 sized and shaped to receive the ridge 117 on the respective lens 7 or 9. The grommets 127 are first placed in the mounting holes 125 with the grooves 128 retainably engaging the wall 123. The lenses 9 and 11 of the light bar 1 are then inserted into the grommets 127 from the inside of the vehicle. The tapered front edges 121 of the ridges 117 allow the ridges 117 to snap into the grooves 129 in the grommets 127, whereas the square rear edges 119 engage the grooves 129 to prevent the lenses 9 and 11 from being easily dislodged from the grommets 127.

With the light bar 1 thus installed, only the front plates 113 of the lenses 9 and 11 communicate with the exterior of the vehicle and only light emitted through the front plates 113 can be seen from outside the vehicle. Any stray light which escapes through other parts of the light bar 1 will not be seen from the exterior of the vehicle. The grommets 127 form a weather resistant seal which prevents moisture from entering the vehicle through the mounting holes 125.

In use, light emitted by the LED 7 is directed onto the center optic 47 which divides the light into three portions. A first portion of the light passes directly through the bridge wall 85 and is emitted through the center lens 9. A second portion is reflected internally off of one of the cavity sidewalls 77 and thereby turned ninety degrees so as to be directed down the respective light pipe 33 to the respective distal optic 99. A third portion is reflected internally off of the other cavity sidewall 77 and thereby turned ninety degrees so as to be directed down the second light pipe 33 to the respective distal optic 99. The second and third portions are each reflected internally off of the respective distal end surface 101 of the respective light pipe 33 and again turned ninety degrees so as to be emitted through the respective distal lens 11. The lens optics 115 and flutes 107 combine to disperse the light in a desired photometric pattern. The bridge wall 85 and sidewalls 77 of the center optic 47 are sized such that the first, second, and third portions of the light are emitted at substantially equal intensity.

It is to be understood that while certain forms of the present invention have been illustrated and described herein, it is not to be limited to the specific forms or arrangement of parts described and shown.

What is claimed and desired to be secured by Letters Patent is as follows:

1. A light bar for a vehicle, comprising:
    a) an elongate body having a center optic, a left distal optic, a right distal optic, a left light pipe extending outwardly from said center optic to said left distal optic, and a right light pipe extending outwardly from said center optic to said right distal optic; and
    b) a light source aligned with said center optic; wherein
    c) said center optic receives light emitted by said light source and divides the light such that a first portion thereof is emitted from said light bar through said center optic, a second portion thereof is transmitted along said left light pipe and emitted from said light bar through said left distal optic, and a third portion thereof is transmitted along said right light pipe and emitted from said light bar through said right distal optic.

2. The light bar as in claim 1 wherein said light source is a light emitting diode.

3. The light bar as in claim 1 wherein said center optic includes a cavity having a pair of sidewalls, each of said sidewalls being shaped to direct a respective one of said second portion and said third portion of the light from said light source down a respective one of said left and right light pipes.

4. The light bar as in claim 3 wherein said center optic further includes a bridge wall connecting said sidewalls, said bridge wall serving to transmit said first portion of the light from said light source outwardly from said center optic.

5. The light bar as in claim 3 wherein said left distal optic and said right distal optic each include a respective light pipe end wall canted at approximately forty five degrees, each said end wall directing the respective one of said second and third portions of the light from said light source outwardly from the respective distal optic.

6. The light bar as in claim 1 wherein said center optic, said left distal optic and said right distal optic are each covered by a respective lens cap.

7. The light bar as in claim 6 wherein said lens caps are red in color.

8. The light bar as in claim 6 wherein said lens caps are amber in color.

9. The light bar as in claim 6 wherein said lens caps are spaced six to twelve inches apart on center.

10. The light bar as in claim 6 wherein:
    a) each said lens cap includes a tubular sidewall and an end wall; and
    b) said light bar further includes a respective elastomeric grommet for each of said lens caps, each said grommet having a center hole sized to receive a respective lens tubular sidewall and a circumferential annular groove; wherein
    c) said grommets serve to mount said light bar to an exterior wall of a vehicle having a respective mounting hole formed therein for each of said lens caps, each said grommet being placeable in a respective one of the mounting holes with the respective circumferential groove accepting a respective annular portion of the exterior wall surrounding the respective mounting hole and said lens cap tubular walls being insertable into said grommet center holes from an interior side of the exterior wall such that said lens cap end walls are visible from outside the vehicle.

11. The light bar as in claim 10 wherein:
    a) each said lens cap includes an annular ridge extending outwardly from the respective tubular sidewall; and
    b) each said grommet includes an internal annular groove sized and shaped to receive the annular ridge on the respective lens cap; wherein
    c) said ridges are engageable with said internal grooves to retain the lens caps in the grommets.

12. The light bar as in claim 11 wherein each said ridge includes a tapered front edge and a square rear edge, said tapered front edges allowing the lens caps to be inserted into the respective grommets whereas the square rear edges inhibit the lens caps from being pulled out of the grommets.

13. The light bar as in claim 6 wherein each said lens cap includes a tubular sidewall having opposing sidewall ends, an end wall closing one of said sidewall ends, and a mounting flange extending outwardly from said sidewall proximate the other of said ends, each said end wall including a lens optic for distributing light in a desired photometric pattern, and each said mounting flange including means for indexing said lens optic relative to said body.

14. The light bar as in claim 2 wherein said light emitting diode is mounted on a circuit board and said body further includes a rearwardly opening chamber formed in said body behind said center optic, said circuit board being received within said chamber.

15. The light bar as in claim 14 wherein said circuit board further includes an electric circuit for illuminating said light emitting diode and said electric circuit is connectable to an electrical system of a vehicle through a single pair of lead wires.

16. The light bar as in claim 15 wherein said electric circuit includes a full wave rectifier bridge for providing correct polarity to said light emitting diode irrespective of how said lead wires are connected to the vehicle electrical system.

17. The light bar as in claim 15 wherein said electric circuit includes a transient voltage suppressor connected in parallel to said light emitting diode.

18. The light bar as in claim 15 and further including a backing plate received within said chamber behind said circuit board, said backing plate being retained in position by protrusions extending inwardly from opposed walls of said chamber.

19. The light bar as in claim 18 wherein said backing plate includes a wire retainer for holding said lead wires in a desired position.

20. The light bar as in claim 15 wherein said chamber is sealed with curable urethane to prevent moisture from corroding said electric circuit.

21. An identification light bar for mounting on the rear of a vehicle over 80 inches in width, said light bar comprising:
   a) an elongate body having a center optic, a left distal optic, a right distal optic, a left light pipe extending outwardly from said center optic to said left distal optic, and a right light pipe extending outwardly from said center optic to said right distal optic;
   b) center, left, and right lens caps, covering said center optic said left distal optic, and said right distal optic, respectively, each of said lens caps being red in color and being spaced six to twelve inches apart on center; and
   c) a light emitting diode aligned with said center optic; wherein
   d) said center optic receives light emitted by said light emitting diode and divides the light such that a first portion thereof is emitted from said light bar through said center lens cap, a second portion thereof is transmitted along said left light pipe and emitted from said light bar through said left lens cap, and a third portion thereof is transmitted along said right light pipe and emitted from said light bar through said right lens cap.

22. The light bar as in claim 21 wherein said center optic includes a cavity having a pair of sidewalls, each of said sidewalls being shaped to direct a respective one of said second portion and said third portion of the light from said light emitting diode down a respective one of said left and right light pipes.

23. The light bar as in claim 22 wherein said center optic further includes a bridge wall connecting said sidewalls, said bridge wall serving to transmit said first portion of the light from said light emitting diode outwardly from said center optic.

24. The light bar as in claim 22 wherein said left distal optic and said right distal optic each include a respective light pipe end wall canted at approximately forty five degrees, each said end wall directing the respective one of said second and third portions of the light from, said light emitting diode outwardly from the respective distal optic.

25. The light bar as in claim 21 wherein:
   a) each said lens cap includes a tubular sidewall and an end wall; and
   b) said light bar further includes a respective elastomeric grommet for each of said lens caps, each said grommet having a center hole sized to receive a respective lens tubular sidewall and a circumferential annular groove; wherein
   c) said grommets serve to mount said light bar to an exterior wall of a vehicle having a respective mounting hole formed therein for each of said lens caps, each said grommet being placeable in a respective one of the mounting holes with the respective circumferential groove accepting a respective annular portion of the exterior wall surrounding the respective mounting hole and said lens cap tubular walls being insertable into said grommet center holes from an interior side of the exterior wall such that said lens cap end walls are visible from outside the vehicle.

26. The light bar as in claim 25 wherein:
   a) each said lens cap includes an annular ridge extending outwardly from the respective tubular sidewall; and
   b) each said grommet includes an internal annular groove sized and shaped to receive the annular ridge on the respective lens cap; wherein
   c) said ridges are engageable with said internal grooves to retain the lens caps in the grommets.

27. The light bar as in claim 26 wherein each said ridge includes a tapered front edge and a square rear edge, said tapered front edges allowing the lens caps to be inserted into the respective grommets whereas the square rear edges inhibit the lens caps from being pulled out of the grommets.

28. The light bar as in claim 21 wherein each said lens cap includes a tubular sidewall having opposing sidewall ends, an end wall closing one of said sidewall ends, and a mounting flange extending outwardly form said sidewall proximate the other of said ends, each said end wall including a lens optic for distributing light in a desired photometric pattern, and each said mounting flange including means for indexing said lens optic relative to said body.

29. The light bar as in claim 21 wherein said body further includes a chamber formed in said body behind said center optic and said light emitting diode is mounted on a circuit board received within said chamber, said circuit board further including an electric circuit for illuminating said light emitting diode, said electric circuit being connectable to an electrical system of a vehicle through a single pair of lead wires.

* * * * *